United States Patent [19]
Oster

[11] 3,911,343
[45] Oct. 7, 1975

[54] ACCELERATION CONTROL SYSTEM FOR ELECTRICALLY PROPELLED TRACTION VEHICLES

[75] Inventor: Lloyd Robert Oster, Erie, Pa.

[73] Assignee: General Electric Company, Erie, Pa.

[22] Filed: Oct. 17, 1973

[21] Appl. No.: 407,296

[52] U.S. Cl. ............................. 318/392; 318/395
[51] Int. Cl.² ......................................... H02P 5/06
[58] Field of Search ............ 318/384, 385, 387–390, 318/392–395; 187/29

[56] References Cited
UNITED STATES PATENTS

| | | | |
|---|---|---|---|
| 2,792,080 | 5/1957 | Dunlop | 187/29 |
| 3,543,113 | 11/1970 | Miller | 318/392 X |
| 3,543,121 | 11/1970 | Miller | 318/393 |
| 3,559,009 | 1/1971 | Mills | 318/395 X |

Primary Examiner—Robert K. Schaffer
Assistant Examiner—W. E. Duncanson, Jr.
Attorney, Agent, or Firm—W. C. Bernkopf

[57] ABSTRACT

An acceleration control system for electrically propelled traction vehicles wherein a traction motor signal varying with torque, such as armature current, is compared with a reference control signal to maintain desired acceleration levels. One of the signals is coupled to the comparison circuit through a resistance network including a potentiometer whose arm setting is maintained proportional to the actual loaded weight of the vehicle by an air pressure transducer system. In propulsion systems where plural resistances in the motor circuit are sequentially shunted, the comparison circuit has a two state, i.e. bi-level, output. One state permits commutation of the resistances and the other inhibits commutation. Jerk control may be obtained by coupling the one signal to a clamped ramp circuit. The ramp output and the one signal are compared to provide another two state output, so that commutation of the resistances is additionally inhibited when there is an excessive rate of change of acceleration.

10 Claims, 9 Drawing Figures

ACCELERATION CONTROL SYSTEM FOR ELECTRICALLY PROPELLED TRACTION VEHICLES

BACKGROUND OF THE INVENTION

This invention relates to propulsion control systems for vehicles, and more particularly to an improved arrangement for controlling switching means to provide propulsion or retarding effort at controlled acceleration or deceleration rates.

Acceleration of electric propulsion motors for vehicles may be controlled by modifying motor voltage or current. Control may be obtained by various means, including by switching resistors in circuit with the motor and the power source. Series d-c propulsion motor systems have acceleration resistors in the motor circuit. At low speeds, and low back emf, the magnitudes of acceleration resistance is large. As the motor back emf increases with increasing motor speeds, acceleration resistors are sequentially shunted out so as to decrease the magnitude of acceleration resistance. If the accelerating resistance is decreased too rapidly the motor current increases more rapidly than the motors can accelerate the vehicle. This could damage the propulsion equipment or cause wheel slipping. Therefore acceleration resistance is modified by switching means operating at a controlled rate. Other types of propulsion systems utilizing electronic switching means, instead of acceleration resistors, have their switching rate similarly controlled. The switching rate is commonly controlled by a comparison of an actual motor parameter, such as armature current, with a control or reference signal.

Modern high speed vehicles, such as transit cars, operate at controlled acceleration and deceleration levels established to provide maximum attainable performance compatible with passenger comfort, safety and equipment capability considerations. The acceleration and deceleration of a vehicle is dependent on total car weight. Greater tractive effort and thus greater motor currents are required to accelerate a car loaded with passengers at the same rate as an empty car. Vehicle acceleration control systems, therefore, cannot operate solely by comparison of an actual motor parameter, i.e. current, with a reference signal indicative of desired acceleration or deceleration, but must incorporate means for controlling motor operation as a function of actual weight, termed weight control.

In a prior art arrangement weight control was accomplished by sensing actual motor armature current by a current measuring reactor, CMR. A bias current representative of car weight and of other parameters was applied to a separate control, i.e. bias, winding of the CMR. The output of the CMR varying as a function of the sum of motor current and car weight was compared with an acceleration reference signal to control motor current. However, this summation signal output of the CMR is not a direct function of vehicle acceleration. Therefore, complex circuitry, including plural tapering networks, is required and acceleration control cannot be readily attained for a plurality of acceleration rates. The above considerations are also applicable to deceleration by electric, i.e. dynamic or regenerative, retardation. Therefore the term "acceleration" as used herein means "acceleration" or "deceleration" except in specified situations where this is inappropriate.

OBJECT OF THE INVENTION

It is an object of this invention to provide an improved arrangement for controlling acceleration of electrically propelled vehicles.

It is a further object to provide such an arrangement having an improved car weight control system.

It is a further object to provide a simplified arrangement for controlling the operation of a pilot motor of a propulsion controller system.

SUMMARY OF THE INVENTION

The invention relates to a control system for propulsion motors of a vehicle wherein a first signal representative of an electrical parameter of the motor, which is representative of motor torque, such as armature current, is compared with a second signal representative of desired vehicle acceleration rate to produce an output which controls switching means so as to modify the electrical parameter of the motor. The first signal has a magnitude directly proportional to the motor parameter, e.g. armature current. One of the signals is coupled to the comparison means through a resistance network comprising a potentiometer whose potentiometer arm is automatically positioned proportional to the actual loaded weight of the vehicle such that the respective magnitudes of the signals applied to the inputs of the comparison means are ratioed in respect to each other proportionately to the actual weight of the vehicle. In a preferred embodiment a motor current signal effectively offset to be proportional to motor torque is applied across network comprising the variable resistance means connected serially with second resistance means, the output of the second resistance means, a voltage proportional to vehicle acceleration, is compared to an acceleration reference signal to generate signals to control the switching means. In propulsion control systems utilizing mechanical switching means, such as pilot motors of cam controller systems, the comparison means incorporate switching means whose output prevents actuation of the mechanical switching means when the sensed motor parameter exceeds the reference signal so as to limit acceleration to a commanded value. Preferably the first signal is also applied through acceleration rate control means whose output also inhibits actuation of the switching means so as to preclude excessive rates of change in acceleration. The outputs of the comparison means and of the acceleration rate control means may comprise bi-level signals whose state is indicative of whether additional actuation of the switching means is permissible. The bi-level signal outputs of the comparison and acceleration rate control means may be coupled through an OR circuit to a switching means control circuit.

The novel features believed characteristic of this invention are set forth with particularity in the appended claims. The organization and manner of operation of the invention, together with further objects and advantages thereof, may best be understood by reference to the following description taken in connection with the accompanying drawings in which:

GENERAL DESCRIPTION

Figure 1:
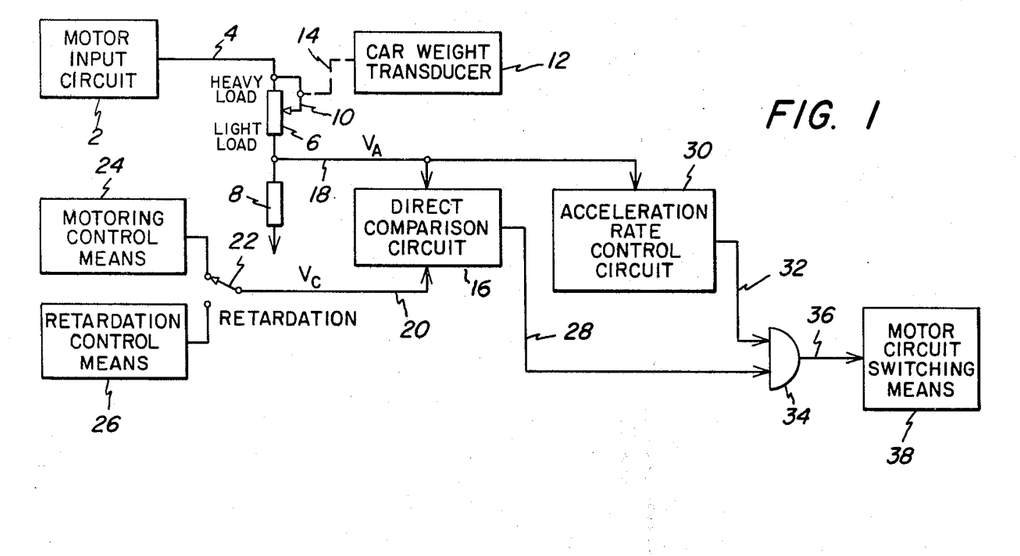
FIG. 1 is a block diagram of the portion of the control system embodying this invention.

FIG. 1 illustrates the arrangement in simplified form. A motor input circuit 2 senses a specified electric parameter of the vehicle propulsion motors which is related to traction motor torque, e.g. motor armature current, and converts this into a suitable output voltage signal, which is a function of motor torque. This motor torque signal on line 4 is applied across a series network comprising potentiometer 6 and fixed resistor 8. Potentiometer 6 has an adjustable potentiometer arm 10 which is electrically connected to line 4. The arm is positioned as a function of actual weight of the vehicle such that with a fully loaded vehicle the arm shorts out minimal resistance and with an empty vehicle the arm shorts out substantially the entire resistance of potentiometer 6. The arm 10 is automatically positioned by a car weight transducer 12. The car weight transducer may be an air pressure cylinder secured intermediate the truck and body of the vehicle such that its output has an air pressure representative of actual vehicle weight. The transducer output is applied through air line 14 to the pressure controlled potentiometer 6 so as to adjust the setting of arm 10 as a function of car weight. The potentiometer 6 is a linear resistance device so that as connected in the preferred embodiment its resistance magnitude is maintained proportional to the actual weight of the vehicle.

The junction of potentiometer 6 and resistor 8 is connected by line 18 to one input of direct comparison means 16. The amplitude of the signal on line 18 is thus related to the amplitude of the signal on line 4 as an inverse function of car weight. Specifically the voltage on line 18 is equal to the product of the voltage on line 4 and the magnitude of resistor 8 divided by the sum of the resistances of potentiometer 6 and resistor 8. Alternatively stated, the voltage on line 18 is equal to $$\frac{V_4}{1 + \frac{R_6}{R_8}}$$

Since resistor 8 is constant, the voltage on line 18 thus is a function of the voltage on line 4 divided by the resistance of potentiometer 6, i.e. a function of car weight.

The signal on line 4 can be presumed to be proportional to motor torque which in turn is proportional to the product of mass and acceleration. Since vehicle acceleration is thus proportional to motor torque divided by actual car weight, the signal on line 18, termed $V_A$, is proportional to vehicle acceleration.

A control voltage, i.e. call, signal $V_C$ is applied on line 20 to a second input of the direct comparison circuit. This signal is representative of desired acceleration. During motoring, i.e. propulsion, of the vehicle, this signal is applied from motoring control means 24 through swich 22 to line 20. During retardation, i.e. electrical braking, the switch 22 is set so that the output of the retardation control means 26 is instead applied to line 20.

Thus the above described arrangement provides for comparison of a first signal which is directly proportional to an electrical parameter of the motor, i.e. propulsion motor armature current, and a second signal which is representative of desired vehicle acceleration. One of the signals is applied directly to the comparison means while the other is applied through a resistance network comprising variable resistance means whose resistance magnitude is proportional to the actual weight of the vehicle, such that the signals as compared are ratioed in respect to each other proportionately to the actual weight of the vehicle.

The output of the direct comparison circuit, on line 28, is a function of comparing actual vehicle acceleration and desired vehicle acceleration. This output signal may control propulsion motor circuit switching means in various ways. The preferred embodiment described below is particularly adapted for use in a stepped switching arrangement for sequentially modifying resistance in the motor circuit. In this arrangement sequential actuation of contactors takes place, to predetermined limits, unless further actuation is inhibited by an inhibit signal. For this type of application the comparison circuit provides a digital or two level output. A first output state having a low or zero voltage permits further actuation of contactors. A second output state having a high voltage inhibits actuation of contactors. Specifically the first output occurs while $V_A$ is less than $V_C$. Thus while the actual vehicle acceleration is less than the desired acceleration further actuation of contactors takes place to increase vehicle acceleration. However, when $V_A$ equals or exceeds $V_C$, the comparison output is switched to the second output state, and the resulting high voltage on line 28 prevents further actuation of contactors and prevents switching.

The described arrangement satisfactorily controls acceleration levels. Passenger comfort and other considerations, however, additionally require that the maximum rate of change of acceleration be controlled so as to prevent undesirable jerking motions. For this purpose the $V_A$ signal on line 18 is applied to an acceleration rate control circuit 30. Circuit 30 generates a bi-level or digital output on output line 32. Line 32 output has a high level output when the $V_A$ signal changes at excessive rates and a low level output when the $V_A$ signal changes at acceptable rates. As described below, the time duration of high level signals is adequate to assure that motor current and car acceleration do not vary at unacceptably high rates. Output lines 28 and 32 are applied to an OR circuit 34 whose output is applied by line 36 to the propulsion motor switching means 38, which is a commutation control means. Thus activation of the motor contactors is inhibited during high level output from either the direct comparison circuit or from the acceleration rate control circuit. This assures that the acceleration levels commanded by the control signal $V_C$ are not exceeded and that acceleration levels are not modified at an excessive rate.

DESCRIPTION OF THE PREFERRED EMBODIMENT

The preferred embodiment is particularly adapted for use with cam controller type of propulsion systems, although the invention may be used in other types of propulsion systems. Prior art cam controller systems are disclosed in U.S. Pat. Nos. 2,566,898 and 3,034,031 which are assigned to the assignee of this application. These permit manual or automatic connection of the propulsion motors in various modes, such as series configuration for low speed operation and parallel configuration for high speed operation. Accelerating resistances in the motor armature and motor field circuits are then sequentially modified in a predetermined manner. During low speed operation a number of traction motors are connected in series circuit with accelerating resistors. These resistors are sequentially shunted to cause the vehicle to accelerate. During high speed operation accelerating resistors connected serially with the parallel or series parallel connected motors are similarly shunted. Additional vehicle speed may be obtained by decreasing motor field strength, such as by sequentially shunting field windings. When the vehicle is to be retarded, the braking effort produced by the propulsion motors is similarly varied. In so-called dynamic braking systems, the retarding effort may be increased by decreasing the magnitude of resistance connected serially with the motor armature circuit.

Propulsion systems of this type are set to operate in predetermined modes, e.g. series, parallel or braking, either manually or by an automatic control system, such as for example, disclosed in U.S. Pat. No. 3,334,224. Upon transition to a selected mode, the accelerating resistances and, in some cases, field shunting means are automatically commutated, i.e. switched in accordance to a predetermined program. This commutation occurs in sequential and discrete steps, termed notching. The preferred embodiment is utilized to control notching so that desired vehicle acceleration levels and acceleration rates are maintained.

In cam controller systems of the type disclosed in U.S. Pat. Nos. 2,566,898 and 3,034,031 notching is obtained by sequentially actuating a series of motor circuit contactors and interlocks by stepped rotation of a cam shaft. The cam shaft is rotated by a pilot motor. Upon transition to a desired mode, the pilot motor drives the cam shaft to a predetermined initial notch position. Thereupon the pilot motor sequentially rotates the cam shaft through a specified series of notches. This is accomplished by a pilot motor circuit. For example, the pilot motor may be advanced by gating a semiconductor device which completes the motor armature circuit. The motor may be stopped rapidly by gating a semiconductor device which shunts the pilot motor armature circuit. In the preferred embodiment the pilot motor circuit, identified in FIG. 1 as motor circuit switching means 38, permits continued rotation of the pilot motor during the application of low level signals on input line 36, but inhibits rotation of the pilot motor during the application of high level signals on input line 36.

MOTOR INPUT CIRCUIT

Figure 2:
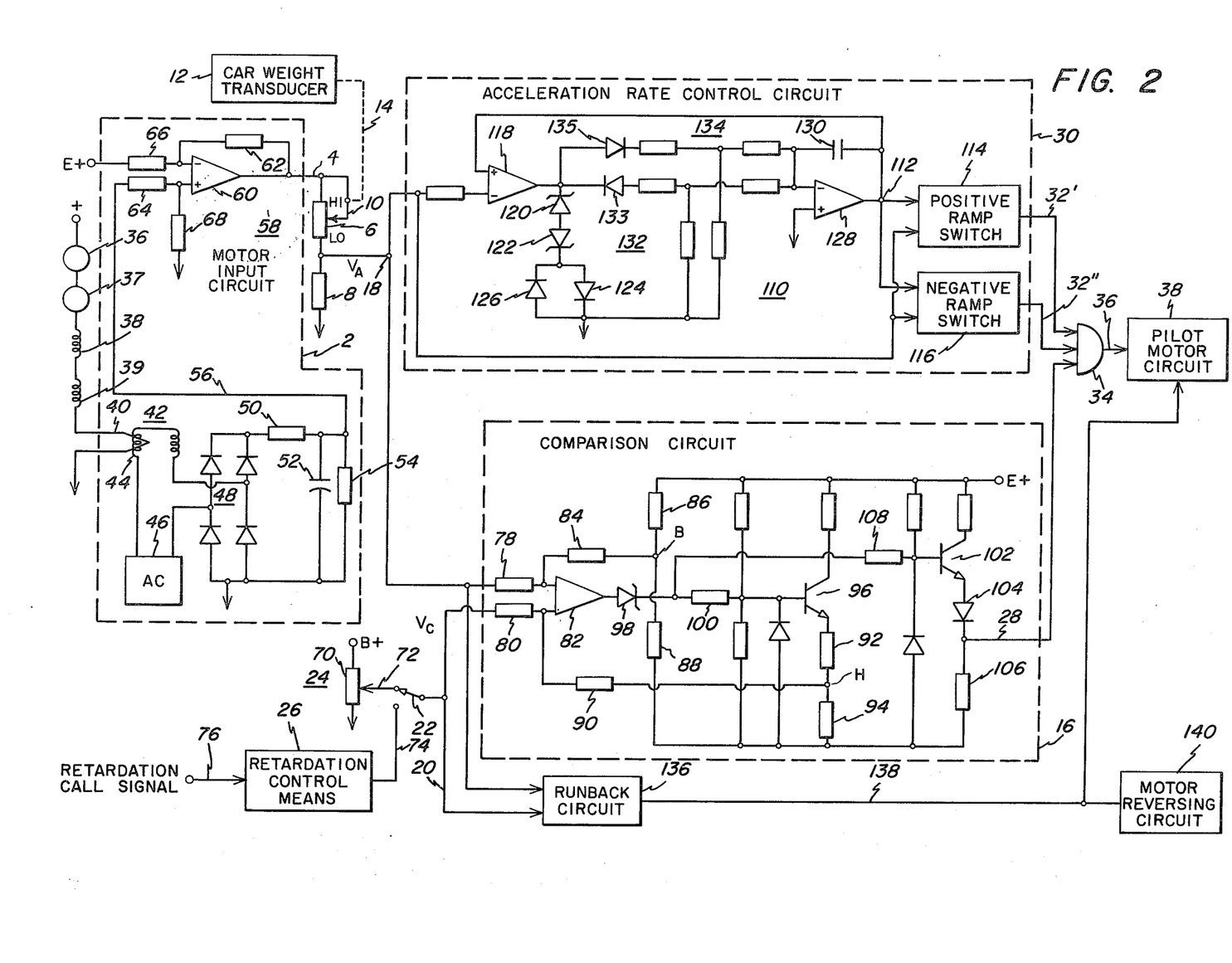
FIG. 2 is a simplified schematic diagram of the arrangement illustrated in FIG. 1.

Reference is now made to FIG. 2 for a more detailed description of the preferred embodiment of the invention. Motor input circuit 2 senses an electrical parameter, e.g. armature current, of the traction motors. In FIG. 2 this arrangement is illustrated by two traction motors connected serially with an input winding 40 of current measuring reactor 42. The traction motors comprise armatures 36 and 37 and fields 38 and 39. The output winding 44 of the current measuring reactor is connected in series circuit with an a-c source 46 to the input of bridge rectifier 48. The rectifier output, filtered by resistor 50 and capacitor 52 appears across load resistor 54. The output, a d-c voltage proportional to propulsion motor armature current, is applied by line 56 to buffer-offset circuit 58. As previously described, accurate acceleration level control is attained by converting a signal proportional to propulsion torque into a signal proportional to vehicle acceleration, $V_A$, and comparing the $V_A$ signal with a control, or call, signal $V_C$ which is representative of desired vehicle acceleration. However, motor armature current is not directly proportional to motor torque since a portion of the armature current represents motor hysteresis and saturation losses and windage and friction losses. Therefore circuit 58 provides a torque voltage signal on line 4 which is offset from the sensed armature current signal on line 56.

Circuit 58 comprises an operational amplifier 60, feedback resistor 62, input resistor 64 connected from line 56 to one input of the operational amplifier, input resistor 66 connected from a fixed voltage source to the other input of the operational amplifier, and resistor 68 connected to a common terminal from the junction of resistor 64 and the input of the operational amplifier. The output voltage on line 4, $V_T$, is related to the voltage $V_I$ on line 56 as follows:

$$V_T = mV_I - V_{offset}$$

Figure 3:
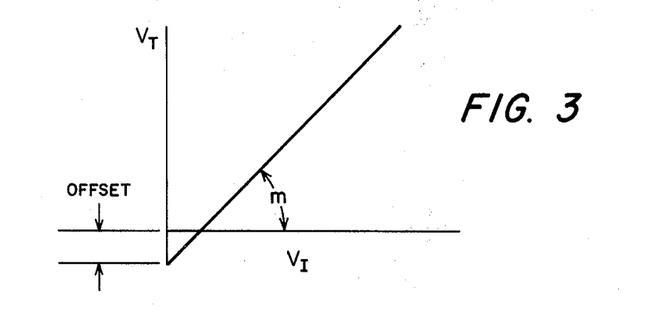
FIG. 3 is a graphic illustration of the translation of motor armature current to a voltage representative of motor torque.

This relationship is illustrated in FIG. 3. Assuming that resistors 62 and 64 are fixed it can be seen that adjustment of resistors 66 and 68 modify the slope $m$ and adjustment of resistor 66 modifies the magnitude of the offset voltage. Adjustment or switching circuits can be provided to appropriately modify these resistance magnitudes for different types of operation, such as motoring and braking.

For some applications circuit 58 may be dispensed with and line 56 connected directly to line 4. For example, offset may be obtained by appropriate design or adjustments of direct comparison circuit 16 or other circuitry. Also some applications may not require precise acceleration level correction so as to warrant an offset arrangement.

WEIGHT CONTROL ARRANGEMENT

As described in connection with FIG. 1, the output of line 4 is applied across serially connected potentiometer 6 and resistor 8 with the output $V_A$ being applied on line 18 from the junction of these devices. In one example, the car weight transducer, i.e. air pressure cylinder, provides an output pressure on air line 14 which varies up to 150 lb/in$^2$ for a fully loaded vehicle having a maximum loaded weight of 75 tons. The air line is connected to pressure controlled potentiometer 6, which, in a preferred embodiment is an air pressure controlled potentiometer type KPG1-120 manufactured by Robinson-Halpern Company of West Conshohocton, Pa. This device provides a resistance between line 4 and junction 18 which varies linearly with air pressure from 50 ohms at 60 lb/in$^2$ to 950 ohms at 150 lb/in$^2$. For fail safe reasons the minimum, i.e. "low" setting of the potentiometer may be specified at an intermediate, i.e. empty car, weight such as, for example, 50 tons and 60 lbs/in$^2$ pressure.

DIRECT COMPARISON AND CALL SIGNAL CIRCUITS

The direct comparison circuit 16 compares the $V_A$ signal on line 18 and the $V_C$ signal on line 20 and produces a low voltage output when $V_A$ is less than $V_C$ and a high voltage output when $V_A$ is greater than $V_C$. During propulsion, i.e. motoring, the $V_C$ signal is derived from motoring control means 24. Predetermined fixed acceleration rates may be established for various propulsion modes, i.e. series and parallel. This is diagramatically represented in FIG. 2 by potentiometer 70 connected in circuit with a source of potential. Potentiometer arm 72, which may be set to any desired acceleration level, has its output connected through switch 22 to line 20. If desired, variable acceleration call signals $V_C$ may be used during propulsion.

During retardation, i.e. electric braking, switch 22 is connected to the output 74 of retardation control means 26. Conventional transit vehicle systems have a so-called "P line" whose current amplitude is a function of desired retardation or propulsion levels. The amplitude is usually zero at full retardation and increases in amplitude as retardation is to be reduced and as propulsion is to be increased. The P line signal is applied on line 76 to control means 26, a current to voltage converter which may incorporate an offset arrangement similar to previously described buffer offset circuit 58. Control means 26 inverts the P line signal such that a decrease of P line current, representative of a greater braking call results in a higher control voltage signal $V_C$.

The $V_A$ and $V_C$ signals are applied respectively through resistors 78 and 80 to the inputs of an operational amplifier 82 of the direct comparison circuit 16. The direct comparison circuit utilized in the preferred embodiment is a bistable level device whose output on line 28 is switched between two states based on the comparison of $V_A$ and $V_C$. The circuit is designed so that switching occurs when $V_A$ and $V_C$ differ by selectable voltage differences. This provides more satisfactory operation in the presence of electrical noise and provides selectable hysteresis and bias conditions. For this purpose feedback resistor 84 is coupled from the $V_A$ input of the operational amplifier to point B, the junction of resistors 86 and 88, and feedback resistor 90 is coupled from the $V_C$ input of the operational amplifier to point H, at the junction of resistors 92 and 94. The latter are connected in the emitter circuit of transistor 96. The output of the operational amplifier is coupled through zener diode 98 and resistor 100 to the emitter of transistor 96. When $V_A + V_H$ is low in respect to $V_C + V_B$, transistor 96 is cut off, $V_H$ and $V_B$ being voltages at terminals H and B, respectively. When $V_A + V_H$ exceeds the sum of $V_C$ and $V_B$, transistor 96 is gated on. The resulting emitter current generates the voltage $V_H$ across resistor 94 to allow on and off gating to occur at different values of $V_A$. Voltages $V_H$ and $V_B$ are adjustable so that the switching levels can be pre-established to meet specific operating requirements. A second transistor 102 has diode 104 and resistor 106 connected in its emitter circuit. The output line 28 is connected to the junction of the latter two components. The base of transistor 102 is connected through resistor 108 to the junction of resistor 100 and zener diode 98. Transistor 102 is thus gated on and off synchronously with transistor 96 and the output of line 28 is switched between high and low level states under the conditions discussed above.

ACCELERATION RATE CONTROL CIRCUIT

The $V_A$ signal on line 18 is also applied to the acceleration rate control circuit 30, which provides a bi-level notch control output to prevent excessive rates of change in vehicle acceleration. This circuit comprises a clamped ramp generator 110 whose output 112 is applied to one of the inputs of positive ramp switch 114 and to negative ramp switch 116. The $V_A$ signal on line 18 is applied to another one of the inputs of the ramp switches. The outputs of these ramp switches are supplied, respectively, by lines 32' and 32" to OR gate 34.

The $V_A$ signal is applied to one input of a first operational amplifier 118 whose output is clamped to a fixed reference value by the circuit comprising zener diodes 120, 122 and diodes 124 and 126. The output is coupled through a diode and resistance network 132, including diode 133, to one input of second operational amplifier 128 which, in view of feedback capacitor 130, constitutes an integrating circuit. The output 112 of the second operational amplifier is fed back to the second input of the first operational amplifier 118. Thus when $V_A$ increases sharply in a positive direction, the clamped negative voltage output of amplifier 118 is applied to the input of operational amplifier 128. The ramp signal $V_R$ at output 112 is a positive rising voltage. When the $V_R$ signal, as applied to one input of the first amplifier 118, exceeds the $V_A$ voltage applied to the other input, amplifier 118 is cut off, and the ramp terminates.

A second diode resistance network 134 is coupled in parallel with the network 132. This network is identical to network 134 except that its series coupling diode 135 is reversed in respect to diode 133. Thus the ramp circuit operates in response to transient changes of $V_A$ in either polarity direction.

Figure 4A:
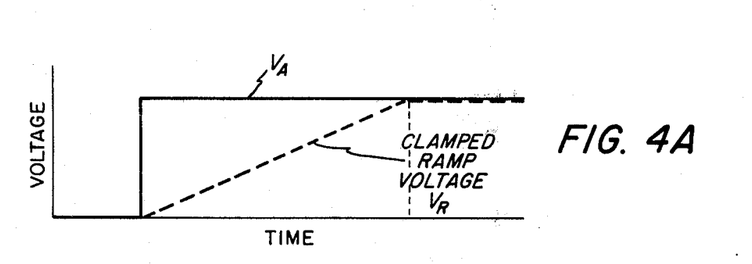
FIGS. 4A and 4B are representations of waveforms illustrating operation of the acceleration rate control circuit.
Figure 4B:
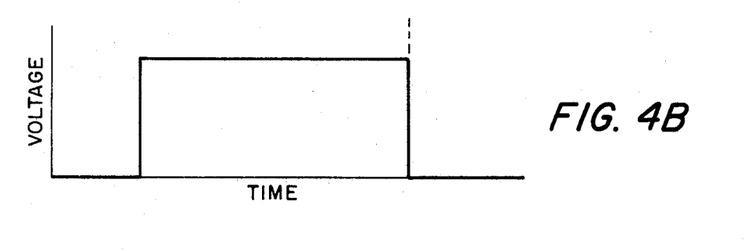

The clamped ramp output at 112, $V_R$, and the $V_A$ signal on line 18 are supplied as inputs to both the positive and negative ramp switches 114 and 116. Each of these may be of identical construction to direct comparison circuit 16. The ramp switches compare $V_A$ with the clamped ramp voltage output 112. During quiescent operation both of these voltages are equal and the ramp switches provide a low level output which permits further notching. If $V_A$ increases rapidly, the positive ramp generator provides a high level output until the clamped ramp voltage $V_R$ equals $V_A$. The operation of the ramp switch is illustrated in FIG. 4A which shows a step wave $V_A$ and resulting ramp voltage $V_R$. The resulting output of the ramp switch is illustrated in FIG. 4B. Similarly, if $V_A$ decreases rapidly, the negative ramp generator provides a high level output until the clamped ramp voltage $V_R$ equals $V_A$. The components of the acceleration rate control circuit may be adjusted to control the maximum permissible acceleration rate.

OPERATION

Figures 5A, 5B:
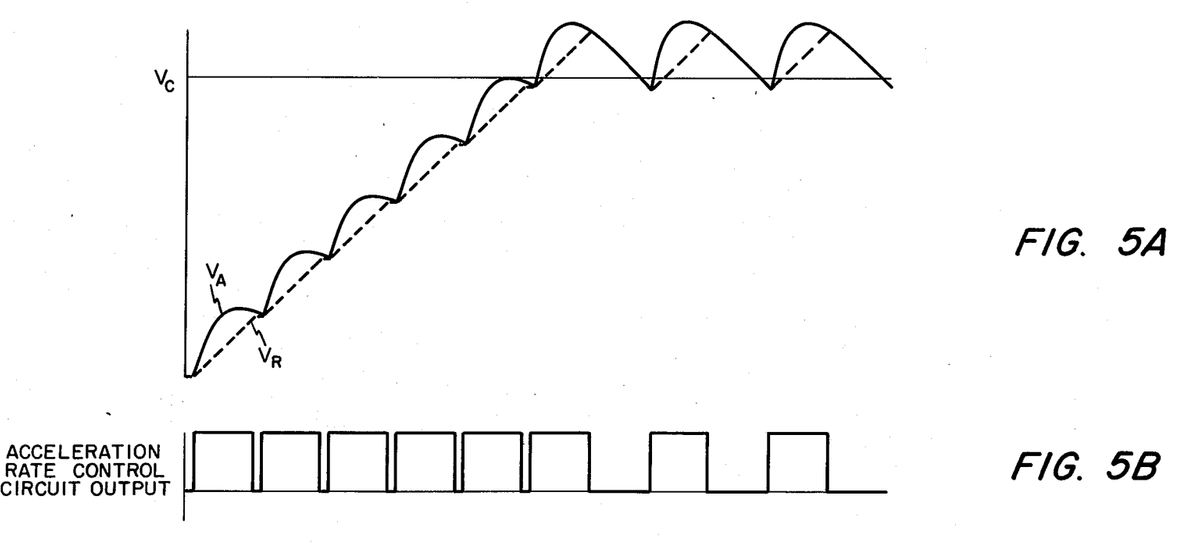
FIGS. 5A-5D are representations of waveforms illustrating notching control.
Figure 5C:
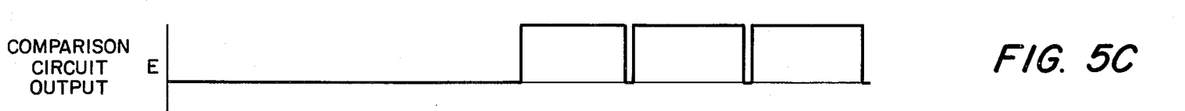
Figure 5D:
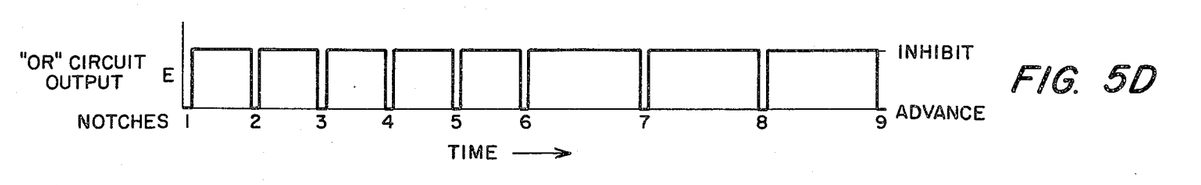

Operation of the preferred embodiment is described with reference to FIG. 5. It is assumed that the propulsion control system has just been set to a specified propulsion mode, e.g. series connection, and that the call voltage, $V_C$, is constant, indicative of a specified constant acceleration rate, as illustrated in FIG. 5A. Upon transition to the selected mode, the pilot motor is advanced by pilot motor control circuit 38 to a first notch, indicated at the lower left of FIG. 5D, since no inhibit signal is initially present at the output line 36 of the OR circuit 34. This causes removal of a predetermined acceleration resistance in the motor circuit. Accordingly the sensed motor parameter, e.g. armature current, increases causing the rapid initial increase of voltage $V_A$ shown in FIG. 5A. The ramp voltage $V_R$, at output 112 of the ramp circuit 110, is initially clamped to the original level of $V_A$. Since $V_A$ is now more positive than $V_R$, the output 32' of the positive ramp switch in the acceleration rate control circuit switches from a low to a high level. As illustrated in FIG. 5A, the ramp voltage $V_R$ increases gradually. $V_A$ initially increases sharply, but as the back emf of the motor increases, the motor current and, therefore, $V_A$ commences to decrease gradually. When $V_R$ has risen sufficiently to equal $V_A$, the output of the acceleration rate control circuit switches from a high to a low level, as illustrated in FIG. 5B. During this time the comparison circuit output, on line 28 remains at a low level, since $V_A$ remains substantially below the level of the control voltage $V_C$. The OR circuit output signal, on line 36, corresponds to the sum of the input signals to the OR circuit 34. Therefore, as illustrated in FIG. 5D, it corresponds to the acceleration rate control circuit output signal illustrated in FIG. 5B. Accordingly upon commutation to notch 1, the signal on line 36 is switched to a high level and the pilot motor circuit 38 inhibits further notching until $V_R$ rises to the level of $V_A$. At such time the signal on line 36 is switched to a low level and the pilot motor circuit causes commutation to the second notch.

The above-described sequence is repeated sequentially until the level of $V_A$ approximately equals that of $V_C$. Until such time the notching is inhibited solely by the acceleration rate control circuit so as to maintain the rate of change of acceleration at desired levels. In the example illustrated in FIG. 5, there are six notches before $V_A$ approaches the level of $V_C$. Of course the actual number of notches will depend upon the parameters of the propulsion system, the level of $V_C$, and the loaded weight of the vehicle.

The comparison circuit assumes control of notching when $V_A$ exceeds $V_C$. As illustrated in FIG. 5A, subsequent to the 6th notch the acceleration voltage $V_A$ and the ramp voltage $V_R$ initially vary in the same manner as described before. As illustrated in FIG. 5B, the output level of the acceleration control circuit is switched to a low level when $V_R$ rises to the level of $V_A$. However, additional notching commutation is now inhibited by the comparison circuit output. As illustrated in FIG. 5C, this output, on line 28, is switched to a high level when $V_A$ exceeds $V_C$. Therefore $V_A$ now continues its gradual decrease in level, due to back emf, until $V_A$ is reduced approximately to the level of $V_C$. At this time the comparison circuit output is switched to a low level and the system is commutated to the next notch. As illustrated in FIG. 5, the above-described notching action continues repetitively so that the desired acceleration level is maintained. However, propulsion control systems cannot accelerate indefinitely. Cam controller systems have a specified total number of notches for each mode. When the system is commutated to the final notch position a logic control system, not illustrated, inhibits further actuation of the pilot motor. At such time the acceleration voltage continues its gradual decrease in level, and acceleration decreases, until there is a change in operations mode or control signal.

The above description was directed to propulsion system control with a fixed value control signal $V_C$. During retardation, i.e. braking, the control signal $V_C$ has a variable magnitude. For some applications the control signal $V_C$ may also have a variable magnitude during motoring, i.e. propulsion. As previously described, the circuit including the positive ramp switch 114 is designed so that during propulsion the rate of change of acceleration and during retardation the rate of change of deceleration does not exceed predetermined limits. Similarly the circuit including the negative ramp switch 116 is designed so that during propulsion any rate of change of deceleration, or during retardation any rate of change of acceleration does not exceed predetermined limits. The comparison circuit 16 is designed so that the vehicle does not accelerate above a commanded level during propulsion, nor decelerate below the commanded level during retardation. However, arrangements utilizing a variable control signal $V_C$ also require that the vehicle does not decelerate below a commanded level during propulsion nor accelerate above a commanded level during retardation. For example, after a vehicle is initially retarded at a high deceleration rate, the braking call signal $V_C$ may be reduced to subsequently retard the vehicle at a lower deceleration rate. The braking call signal $V_C$ is thus reduced below the level of the voltage $V_A$ on line 18, i.e. $V_A$ is greater than $V_C$. Under these conditions, commutation must occur in a reverse sequence, i.e. acceleration resistances must be sequentially reinserted into the system to decrease the deceleration level. Additionally commutation must be controlled so that deceleration is not decreased below the level commanded by the brake call signal $V_C$. A runback circuit 136, illustrated in FIG. 2, is utilized for this purpose. Its design is similar to that of the comparison circuit 16. Its inputs are connected to lines 18, signal $V_A$, and 20, signal $V_C$, such that the output permits additional notching when $V_A$ exceeds $V_C$. It has its output line 138 coupled to a pilot motor reversing circuit 140 and to the pilot motor circuit 38. The bi-level output has a first state when $V_A$ exceeds $V_C$ by at least a predetermined magnitude. This causes a pilot motor to run in a reverse direction and to subsequently reduce $V_A$. When $V_A$ approaches $V_C$, the output signal from the runback circuit inhibits further notching.

While the invention has been particularly shown and described with reference to a preferred embodiment, it will be understood by those skilled in the art that the foregoing and other changes in form and detail may be made therein without departing from the spirit and scope of the invention. For example, in the preferred embodiment, the motor current signal is coupled through the resistance network to derive an acceleration signal which is compared with the reference signal. Alternatively in some propulsion systems it may be feasible to instead apply the reference signal, $V_C$, through the resistance network to one input of comparison means and to apply the motor current signal directly to a second input. This may be accomplished by coupling the reference signal across the potentiometer and coupling the signal developed on the potentiometer arm to the comparison means. For example, the motor current signal on line 56 could be applied directly to line 18. The reference signal on contactor 22 instead of being connected directly by line 20 to the comparison circuit, and runback circuit, would instead be coupled across the series combination of the potentiometer 6 and the resistor 8. The potentiometer arm 10, instead of being connected to one end of the potentiometer, would be connected to line 20.

What I claim as new and desire to secure by letters patent of the United States is:

1. In a control system for propulsion motors of a vehicle wherein a first signal representative of a sensed motor parameter which is a function of motor torque, such as motor current, and a control signal representative of desired vehicle acceleration are applied to the inputs of comparison means whose output actuates switching means controlling the propulsion motor circuit so as to maintain desired vehicle acceleration, the combination comprising:
   a. a source of said first signal whose magnitude is directly proportional to propulsion motor current;
   b. a source of said control signal;
   c. a resistance network comprising a potentiometer having a potentiometer arm;
   d. means for automatically maintaining the setting of said potentiometer arm proportional to the actual loaded weight of said vehicle;
   e. means for coupling said first signal through said resistance network to one of the inputs of said comparison means such that the signal applied to said one input has a magnitude proportional to the magnitude of the first signal divided by the actual loaded weight of the vehicle and for coupling said control signal directly to another input of said comparison means, so that the first and control signals upon comparison are ratioed in respect to each other proportionately to the actual loaded weight of the vehicle.

2. The arrangement of claim 1 wherein said resistance network comprises said potentiometer and additional resistance means coupled serially to said source of first signals, said potentiometer arm being connected to one end terminal of the potentiometer such that the total resistance of said potentiometer varies proportionately with vehicle weight, and means to couple the signal appearing across said additional resistance means to said one input of said comparison means.

3. The arrangement of claim 2 wherein the signal coupled to said one input equals:

$$\frac{E_{\text{1st signal}}}{1 + \frac{R_{\text{potentiometer}}}{R_{\text{second resistor}}}}$$

4. The arrangement of claim 1 comprising means to offset one of said signals by a fixed voltage magnitude representative of propulsion motor and windage and friction losses.

5. In a control system for vehicles wherein impedance means in circuit with electrical propulsion motors are sequentially commutated in a predetermined sequence, the combination comprising:
   a. a source of first signals responsive solely to propulsion motor current;
   b. a source of reference signals representative of desired propulsion motor acceleration;
   c. comparison means having a plurality of inputs and at least one output;
   d. a resistance network comprising a potentiometer having a potentiometer arm;
   e. means for automatically maintaining the setting of said potentiometer arm proportional to the actual loaded weight of the vehicle;
   f. means for coupling said first signals through said resistance network to one of the inputs of said comparison circuit such that their magnitude is modified proportionately to the actual weight of the vehicle, whereby the signals applied to said one input are proportional to vehicle acceleration, and for coupling said reference signals to another input of said comparison circuit so that the first and reference signals upon comparison are ratioed in respect to one another proportionally to the actual loaded weight of the vehicle;
   g. commutation control means;
   h. means for coupling the output of said comparison means to said commutation control means to automatically control the time interval between successive commutations to provide vehicle acceleration in accordance to said reference signal.

6. The arrangement of claim 5 wherein said comparison means comprises bi-level switching means providing an output whose level is switched from a first to a second state dependent on the relative magnitudes of said first and reference signals, the level of said first state permitting further commutation and the level of said second state inhibiting further commutation.

7. The arrangement of claim 6 comprising an acceleration control circuit responsive to the acceleration signals and arranged to provide an additional bi-level output to said commutation control means, said additional output having a first level permitting further commutation during time intervals when the rate of change of acceleration is within a predetermined level and a second level inhibiting further commutation when the rate of change of acceleration is in excess of a predetermined level.

8. The arrangement of claim 7 wherein said acceleration control circuit comprises a clamped ramp circuit responsive to a rapid change in the level of said acceleration signal to produce a ramp signal whose level changes at a predetermined slow rate and means for comparing said acceleration signal and said ramp signal to produce an output signal having a level inhibiting commutation from the commencement of said rapid change until the level of said ramp signal substantially equals the instantaneous level of said acceleration signal.

9. An automatic acceleration control for traction vehicles wherein a multiple contact controller is driven by an electrical pilot motor means to rotate the controller cam shaft to successive index positions to incrementally commutate resistances connected in circuit with the electrical traction motor, pilot motor circuit means for said pilot motor; the combination for sequentially gating said pilot motor circuit to control the acceleration of said vehicle, comprising:
   a. a source of current signals whose magnitude is directly proportional to traction motor armature current;
   b. means for converting said current signals to a first voltage signal substantially proportional to traction motor torque;
   c. means responsive to actual vehicle weight for dividing said first voltage signal by a proportionality factor representative of actual traction vehicle weight to derive an acceleration voltage representative of actual traction vehicle acceleration;

d. means for comparing said acceleration voltage and said reference voltage to produce a first output to said pilot motor circuit means permitting actuation of said pilot motor means and commutation of said resistances when the acceleration voltage is below the acceleration level commanded by said reference voltage, and to produce a second output inhibiting actuation of said pilot motor means when the acceleration voltage attains the level of said reference voltage.

10. The arrangement of claim 9 comprising backup means for comparing said acceleration voltage and said reference voltage to actuate means to reverse the normal direction of said pilot motor means during vehicle retardation in the event the level of said reference signal is below the level of said acceleration voltage and to permit commutation until vehicle deceleration is decreased to the level commanded by said reference signal.

* * * * *